US012569934B2

(12) United States Patent
Grafton-Reed

(10) Patent No.: US 12,569,934 B2
(45) Date of Patent: Mar. 10, 2026

(54) SYSTEM AND METHOD FOR WELDING COMPONENTS

(71) Applicant: ROLLS-ROYCE plc, London (GB)

(72) Inventor: Clive Grafton-Reed, Leicester (GB)

(73) Assignee: Rolls-Royce plc

( * ) Notice: Subject to any disclaimer, the term of this patent is extended or adjusted under 35 U.S.C. 154(b) by 884 days.

(21) Appl. No.: 17/859,126

(22) Filed: Jul. 7, 2022

(65) Prior Publication Data

US 2023/0024807 A1     Jan. 26, 2023

(30) Foreign Application Priority Data

Jul. 23, 2021    (GB) ...................................... 2110597

(51) Int. Cl.
   B23K 26/24          (2014.01)
   B23K 26/03          (2006.01)
       (Continued)
(52) U.S. Cl.
   CPC ............ B23K 26/24 (2013.01); B23K 26/032 (2013.01); B23K 26/0619 (2015.10);
       (Continued)
(58) Field of Classification Search
   CPC ............................ B23K 26/032; B23K 26/046;
              B23K 26/0619; B23K 26/0626; B23K 26/0665;
       (Continued)

(56) References Cited

U.S. PATENT DOCUMENTS 5,676,866 A * 10/1997 in den Baumen . B23K 26/0673
                                           219/121.77
2013/0248506 A1* 9/2013 Dagenais ........... B23K 37/0276
                                           219/136
(Continued)

FOREIGN PATENT DOCUMENTS

CN        1586787 A      3/2005
DE    102010012532 A1    9/2011
(Continued)

OTHER PUBLICATIONS

Great Britain search report dated Apr. 20, 2022, issued in GB Patent Application No. 2110597.8.
European Search Report dated Dec. 1, 2022, issued in EP Patent Application No. 22180599.7.

*Primary Examiner* — Justin C Dodson
(74) *Attorney, Agent, or Firm* — Barnes & Thornburg

(57)          ABSTRACT
A system for welding a first component to a second component. The system includes a first laser head configured to emit a first laser beam and be movably disposable on a first side of the first component. The system further includes a second laser head configured to emit a second laser beam and be movably disposable on an opposing second side of the first component. The system further includes a controller configured to independently control a first power of the first laser beam and a second power of the second laser beam. The controller is also configured to independently and simultaneously control movement of the first laser head and movement of the second laser head relative to the first component.

20 Claims, 10 Drawing Sheets

(51) Int. Cl.

| | |
|---|---|
| B23K 26/06 | (2014.01) |
| B23K 26/062 | (2014.01) |
| B23K 26/067 | (2006.01) |
| B23K 26/08 | (2014.01) |
| B23K 26/14 | (2014.01) |
| *B23K 101/00* | (2006.01) |

(52) U.S. Cl.
CPC ...... B23K 26/0626 (2013.01); B23K 26/0665 (2013.01); B23K 26/0673 (2013.01); B23K 26/0869 (2013.01); B23K 26/14 (2013.01); *B23K 2101/001* (2018.08)

(58) Field of Classification Search
CPC ...................... B23K 26/0673; B23K 26/0869; B23K 26/24; B23K 2101/001
See application file for complete search history.

(56) References Cited

U.S. PATENT DOCUMENTS

| | | | | |
|---|---|---|---|---|
| 2014/0021178 A1* | 1/2014 | Brockmann | ......... | G02B 6/3528 |
| | | | | 219/121.77 |
| 2016/0054121 A1* | 2/2016 | Snis | ........................ | B22F 10/28 |
| | | | | 250/234 |
| 2016/0074964 A1* | 3/2016 | Zollinger | ............. | B23K 26/032 |
| | | | | 219/121.64 |
| 2016/0202045 A1* | 7/2016 | Schönleber | ......... | B23K 26/046 |
| | | | | 356/497 |
| 2017/0151634 A1* | 6/2017 | Witney | .................. | G01N 29/04 |

FOREIGN PATENT DOCUMENTS

| | | |
|---|---|---|
| EP | 0754519 A1 | 1/1997 |
| WO | 9323196 A1 | 11/1993 |

* cited by examiner

SYSTEM AND METHOD FOR WELDING COMPONENTS

CROSS-REFERENCE TO RELATED APPLICATIONS

This specification is based upon and claims the benefit of priority from United Kingdom patent application number GB 2110597.8 filed on Jul. 23, 2021, the entire contents of which is incorporated herein by reference.

BACKGROUND

Technical Field

The present disclosure generally relates to welding, and in particular to a system and a method for welding a first component to a second component.

Description of the Related Art

Gas turbine engines are typically employed to power aircrafts. Typically, a gas turbine engine comprises an axial fan driven by an engine core. The engine core is generally made up of one or more turbines which drive respective compressors via coaxial shafts. The fan is generally driven off an additional lower pressure turbine in the engine core. Airflow from the fan is split with most of the air being directed through a bypass duct and the remainder of the air being directed to the engine core.

Fan outlet guide vanes (OGVs) are provided in the bypass duct, and extend between a radially inner ring (e.g., a casing of the core) and a radially outer casing (e.g., a casing proximal to a nacelle of an engine). OGVs are load bearing structures. If structures such as A-frames are also provided, the OGVs are arranged to transmit radial and axial loads from the outer casing to the inner ring, and the A-frames transmit the torsional loads and some radial loads.

Conventionally, an OGV is fixedly attached to a stub of the inner ring (casing of core) by using electron beam welding or laser welding with a single head. Due to complicated shapes of aerofoil structures of the OGVs, it may be difficult to produce an accurate weld joint between the OGV and the stub. Therefore, electron beam and laser welding of the OGV and the stub may be challenging due to limited access and curvature of the aerofoil structure of the OGV. This may further cause uneven welding at different portions of a welding zone.

Additionally, single head laser welding and electron beam welding need to produce a deep and narrow penetration of a thicker leading edge of the OGV. This may further cause distortion of the OGV and/or the stub towards one side. While welding the OGV to the stub at one side, it may be difficult to access an opposing side for welding due to unclear line of sight of the opposing side. This may further increase a thickness of a material being welded at one side.

Furthermore, electron beam welding typically requires a vacuum chamber to produce welding joints between two or more parts. Thus, for welding large structures, such as for welding a full ring of OGVs, one requires a large vacuum chamber which will, which may increase an overall cost of the electron beam welding process.

Hence, while welding the OGV and the stub, getting an accurate joint alignment at a distance may be difficult. Moreover, welding power may also need to be adjusted at different sections due to constantly changing cross-section, form, and thickness of the aerofoil structure of the OGV.

Therefore, there exists a need for a welding system and a welding method which overcome the above-mentioned problems.

SUMMARY

According to a first aspect there is provided a system for welding a first component to a second component. The system includes a first laser head configured to emit a first laser beam and be movably disposable on a first side of the first component. The system further includes a second laser head configured to emit a second laser beam and be movably disposable on an opposing second side of the first component. The system further includes a controller configured to independently control a first power of the first laser beam and a second power of the second laser beam. The controller is further configured to independently and simultaneously control a movement of the first laser head and a movement of the second laser head relative to the first component in order to weld the first component to the second component along an interface between the first component and the second component.

In some embodiments, the first component and the second component are components of a gas turbine engine.

In some embodiments, the first component is a fan outlet guide vane (OGV) of the gas turbine and the second component is a part of a core casing of the gas turbine engine.

In an example, the first laser head is configured to emit the first laser beam and be movably disposable on a first side of the OGV (the first component). Similarly, the second laser head is configured to emit the second laser beam and be movably disposable on an opposing second side of the OGV. The two laser beams on the opposing sides of the first component (i.e., the OGV) may produce a relatively accurate weld joint between the first component (i.e., the OGV) and the second component (i.e., the core casing). Further, the system including the first and second laser heads with their respective first and second laser beams, may easily weld the OGVs to the core casing as compared to conventional welding systems facing the challenges of complicated shapes of aerofoil structures of the OGVs. Thus, a quality of welding provided by the proposed system with two laser heads (i.e., the first laser head and the second laser head) may be minimally affected by the limited access and the curvature of the aerofoil structure of the OGV. The system may therefore generate a desirable welding at different portions of a welding zone between the first component and the second component.

In the proposed system, for welding the first component to the second component, the first laser beam is emitted at the first side of the first component and the second laser beam is emitted at the second side of the first component. Welding the first component to the second component by using two laser beams (i.e., the first and second laser beams) may eliminate any distortion of the first component towards one of the first and second sides as compared to conventional welding techniques. In an example, welding the OGV (i.e., the first component) to the core casing (i.e., the second component) by using the first and second laser beams may not cause distortion of the OGV towards one of its opposing first and second sides. Further, with the inclusion of two laser heads (i.e., the first and second laser heads), it may be relatively easier for the system to access the second side to weld the first component to the second component at the second side. This may further help to maintain a desirable thickness of a material being welded at both the first and second sides of the first component.

Moreover, for welding the first component to the second component by using the first laser beam and the second laser beam, there is no requirement for a vacuum chamber, which was otherwise required in conventional systems for welding the first component to the second component by an electron beam. This may further reduce an overall cost of welding the first component to the second component by the first laser head and the second laser head.

As mentioned above, for welding the first component to the second component, the controller of the system independently controls the first power of the first laser beam and the second power of the second laser beam. In an example, due to constantly changing cross sections and thickness of the OGV (i.e., the first component), the system including the controller may emit the first laser beam with a desirable first power and the second laser beam with a desirable second power. Therefore, the system including the controller may emit differently powered laser beams at different sections of an interface between the first component and the second component. By controlling and adjusting the first and second powers of the respective first and second laser beams, the system may produce a relatively accurate joint alignment as compared to the conventional welding systems. Some applications may require different values of the first and second powers of the respective first and second laser beams to generate a precise weld joint between the first component and the second component.

As mentioned above, the system including the controller may independently and simultaneously control the movement of the first laser head and the movement of the second laser head relative to the first component. The independent and simultaneous movement of the first laser head and the second laser head relative to the first component may therefore help the system to emit the laser beams across an overall area of the interface between the first component and the second component. This may also help in welding the first component to the second component at the areas which are not directly located in the line of sight.

In some embodiments, the system further includes a laser source configured to emit a laser radiation and a splitter optically coupled to the laser source. The splitter is configured to split the laser radiation into a first input laser beam to be supplied to the first laser head and a second input laser beam to be supplied to the second laser head. The controller is communicably coupled to the splitter and further configured to control the splitter to independently control a first input power of the first input laser beam and a second input power of the second input laser beam for independently controlling the first power of the first laser beam and the second power of the second laser beam.

In some embodiments, the system further includes a first optical fibre optically coupled to the splitter, and configured to receive the first input laser beam from the splitter and supply the first input laser beam to the first laser head. The system further includes a second optical fibre optically coupled to the splitter, and configured to receive the second input laser beam from the splitter and supply the second input laser beam to the second laser head.

In some embodiments, the first laser head includes a first collimating unit configured to receive the first input laser beam from the first optical fibre and collimate the first input laser beam to provide a first collimated laser beam. The first laser head further includes a first focusing unit configured to receive the first collimated laser beam from the first collimating unit and focus the first collimated laser beam to provide the first laser beam.

In some embodiments, the first laser head further includes a first adjustment unit configured to adjust a first axial distance between the first collimating unit and the first focusing unit. The controller is communicably coupled to the first adjustment unit and configured to adjust the first axial distance in order to adjust a first laser spot size of the first laser beam incident on the first component.

In some embodiments, the first laser head further includes a first output unit configured to receive the first laser beam from the first focusing unit and emit the first laser beam towards the first component. The first laser head further includes a first rotation joint configured to selectively rotate the first output unit about a first longitudinal axis of the first laser head. The controller is communicably coupled to the first rotation joint and further configured to control the first rotation joint in order to adjust a first direction of the first laser beam in a first plane orthogonal to the first longitudinal axis.

In some embodiments, the system further includes a first connector connecting the first optical fibre to the first laser head and configured to supply the first input laser beam to the first collimating unit.

In some embodiments, the second laser head includes a second collimating unit configured to receive the second input laser beam from the second optical fibre and collimate the second input laser beam to provide a second collimated laser beam. The second laser head further includes a second focusing unit configured to receive the second collimated laser beam from the second collimating unit and focus the second collimated laser beam to provide the second laser beam.

In some embodiments, the system further includes a second connector connecting the second optical fibre to the second laser head and configured to supply the second input laser beam to the second collimating unit.

In some embodiments, the second laser head further includes a second adjustment unit configured to adjust a second axial distance between the second collimating unit and the second focusing unit. The controller is communicably coupled to the second adjustment unit and configured to adjust the second axial distance in order to adjust a second laser spot size of the second laser beam incident on the first component.

In some embodiments, the second laser head further includes a second output unit configured to receive the second laser beam from the second focusing unit and emit the second laser beam towards the first component. The second laser head further includes a second rotation joint configured to selectively rotate the second output unit about a second longitudinal axis of the second laser head. The controller is communicably coupled to the second rotation joint and further configured to control the second rotation joint in order to adjust a second direction of the second laser beam in a second plane orthogonal to the second longitudinal axis.

In some embodiments, the system further includes a first arm assembly coupled to the first laser head, a first actuator unit configured to move the first arm assembly relative to the first component, a second arm assembly coupled to the second laser head, and a second actuator unit configured to move the second arm assembly relative to the first component. The controller is communicably coupled to the first actuator unit and the second actuator unit. The controller is further configured to independently control the first actuator unit and the second actuator unit for independently and simultaneously controlling the movement of the first laser head and the movement of the second laser head relative to the first component.

In some embodiments, the system further includes a first imaging unit configured to generate a first image of a first welding zone around the first laser beam. The system further includes a second imaging unit configured to generate a second image of a second welding zone around the second laser beam. The controller is communicably coupled to the first imaging unit and the second imaging unit. The controller is further configured to control at least one first parameter of the first laser head based on the first image and control at least one second parameter of the second laser head based on the second image.

In some embodiments, the system further includes a first shielding unit configured to emit a first shielding gas around the first laser beam and a second shielding unit configured to emit a second shielding gas around the second laser beam.

According to a second aspect there is provided a method for welding a first component to a second component. The method includes a step of providing a first laser head at a first side of the first component. The first laser head is configured to emit a first laser beam. The method further includes a step of providing a second laser head at a second side opposite to the first side of the first component. The second laser head is configured to emit a second laser beam. The method further includes a step of independently controlling a first power of the first laser beam and a second power of the second laser beam. The method further includes a step of independently and simultaneously moving the first laser head and the second laser head relative to the first component in order to weld the first component to the second component along an interface between the first component and the second component.

In some embodiments, the method further includes adjusting a first laser spot size of the first laser beam incident on the first component and adjusting a second laser spot size of the second laser beam incident on the first component.

In some embodiments, the method further includes adjusting a first direction of the first laser beam in a first plane orthogonal to a first longitudinal axis of the first laser head. The method further includes adjusting a second direction of the second laser beam in a second plane orthogonal to a second longitudinal axis of the second laser head.

In some embodiments, the method further includes obtaining a first image of a first welding zone around the first laser beam. The method further includes controlling at least one first parameter of the first laser head based on the first image. The method further includes obtaining a second image of a second welding zone around the second laser beam. The method further includes controlling at least one second parameter of the second laser head based on the second image.

In some embodiments, the method further includes emitting a first shielding gas around the first laser beam and emitting a second shielding gas around the second laser beam.

In some embodiments, the method further includes moving the first laser head and the second laser head on opposing sides of another first component after welding the first component to the second component. The method further includes controlling the first laser head and the second laser head to weld the other first component to a corresponding second component.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
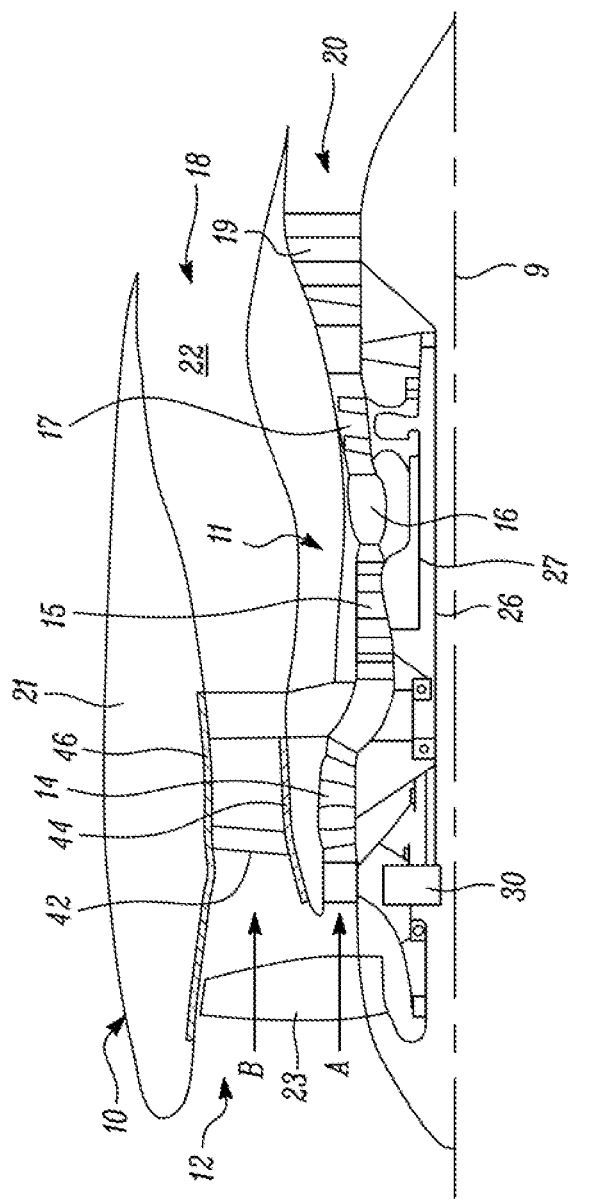
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustor 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via an input shaft 26 and an epicyclic gearbox 30.

The gas turbine engine 10 comprises fan outlet guide vanes (OGVs) 42 provided in the bypass duct 22. In FIG. 1, only one OGV 42 is shown for illustrative purposes. The OGVs 42 guide airflow from the fan 23 through the bypass duct 22. The OGVs 42 extend from an inner ring that connects to or forms part of a core casing 44 that splits airflow from the fan 23 between the bypass duct 22 and the engine core 11. The OGVs 42 are connected to an outer casing 46 of the bypass duct 22. Generally, the OGVs 42 are arranged to transfer axial, radial and torsional loads.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
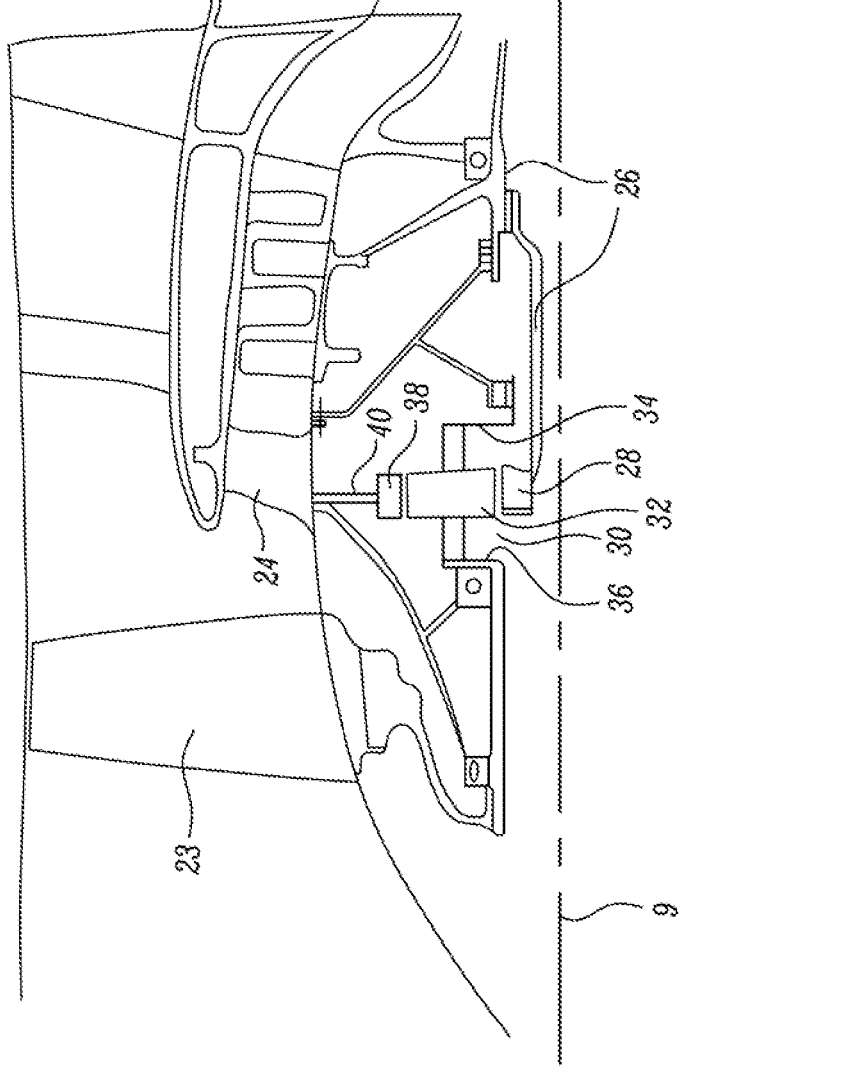
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the input shaft 26, which is coupled to a sun wheel, or sun gear, 28 of the epicyclic gearbox 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the input shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
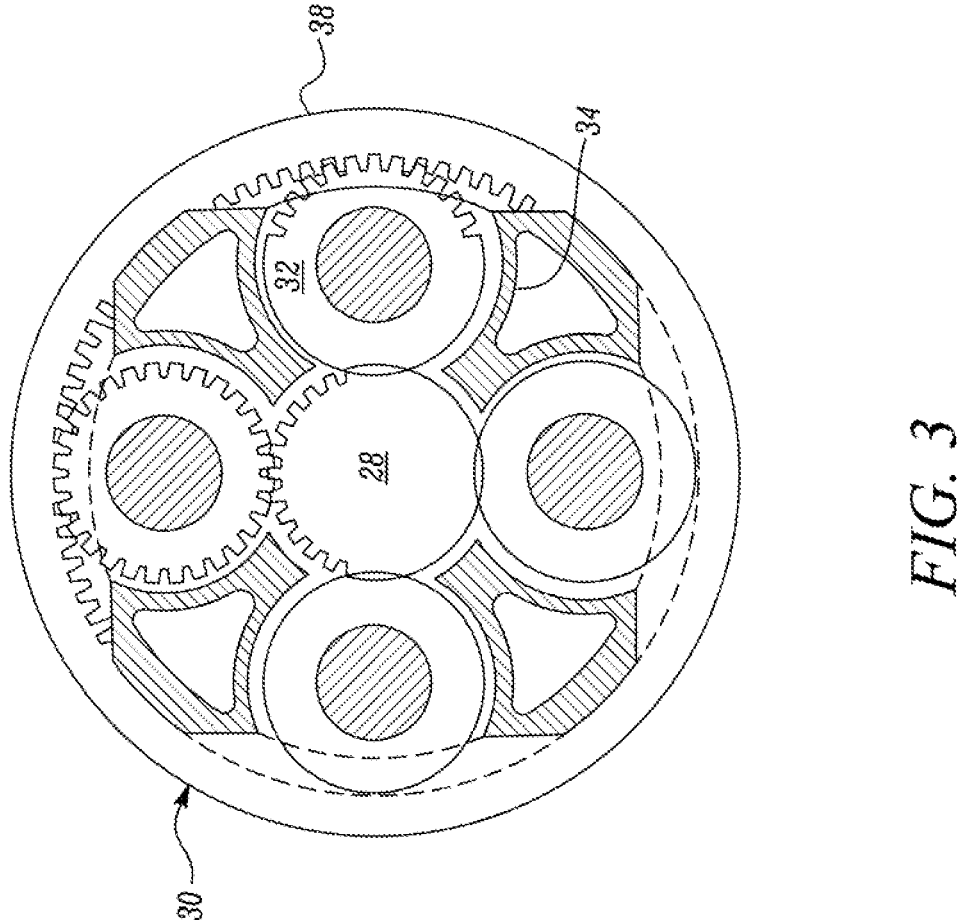
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30. In some other arrangements, the gas turbine engine 10 may comprise a direct drive.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines and land-based gas turbine engines.

Figure 4:
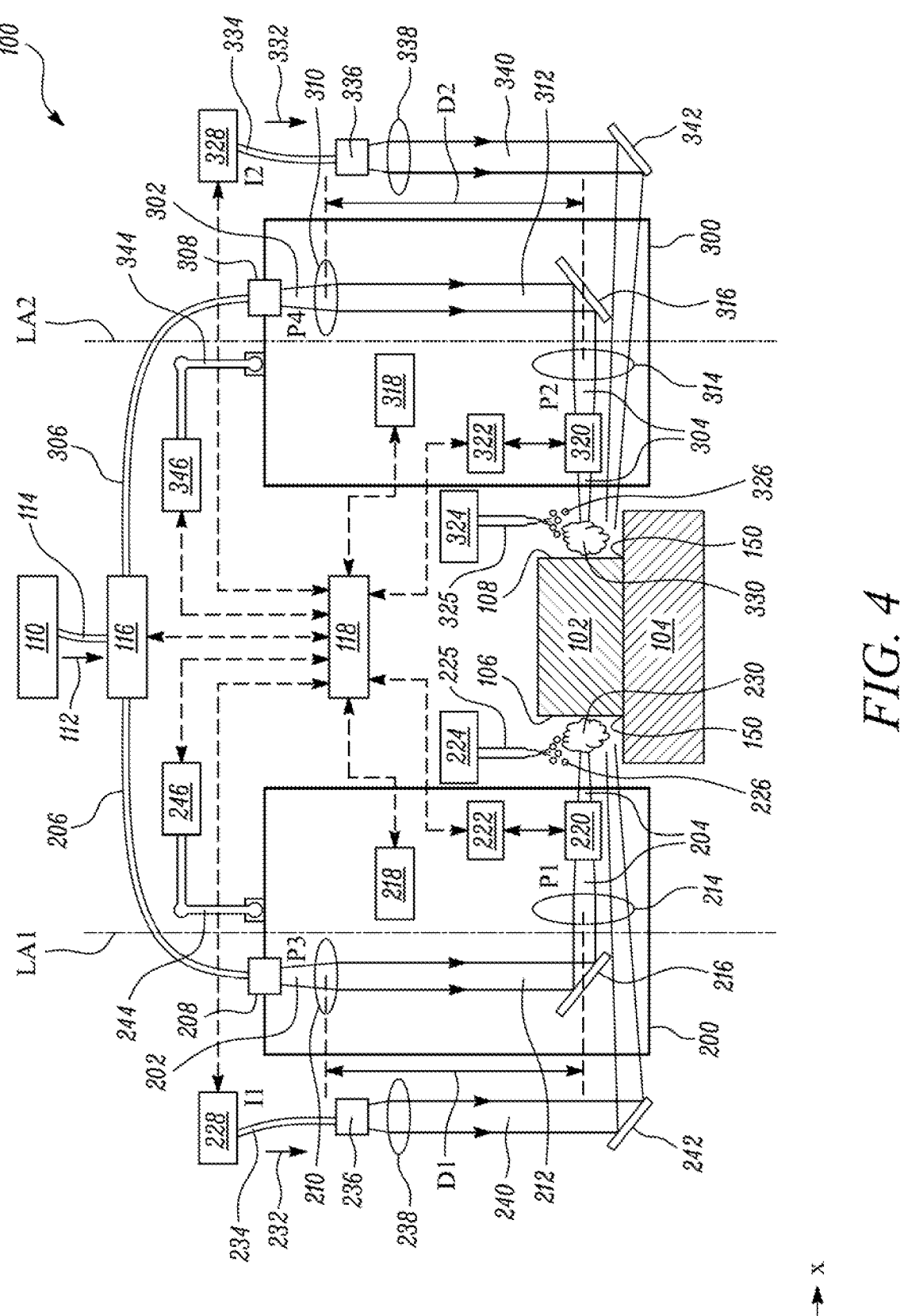
FIG. 4 is a schematic block diagram of a system for welding a first component to a second component, according to an embodiment of the present disclosure.

Turning now the system and method of the present disclosure:

FIG. 4 illustrates a schematic block diagram of a system 100 for welding a first component 102 to a second component 104, according to an embodiment of the present disclosure. In some embodiments, the first component 102 and the second component 104 are components of the gas turbine engine 10 (shown in FIG. 1). In some embodiments, the first component 102 is an OGV 42 and the second component 104 is a part of the core casing 44. As shown in FIG. 4, the system 100 defines mutually orthogonal x, y, and z-axes.

The system includes a laser source 110 configured to emit a laser radiation 112. In some embodiments, the laser source 110 includes solid-state lasers that use ytterbium oxide (Yb2O3) in disc form or as an internal coating in a fibre. In some embodiments, the laser source 110 may include any other suitable laser, such as, for example, a feedback laser, a non-feedback laser, a CO2 laser or a green laser. In an example, the laser source 110 may include an eximer laser (e.g., ArF, KrF, XeCl), or a semiconductor-type laser (GaAs, GaAlAs). The system further includes a splitter 116 coupled to the laser source 110 through an optical cable 114. Thus, the laser radiation 112 is carried from the laser source 110 to the splitter 116 through the optical cable 114.

The system 100 further includes a first laser head 200 and a second laser head 300. In some embodiments, the splitter 116 is configured to split the laser radiation 112 into a first input laser beam 202 to be supplied to the first laser head 200 and a second input laser beam 302 to be supplied to the second laser head 300. In an example, the splitter 116 may include any optical element or combination of optical elements, for example, a prism or a mirror that serves to split the laser radiation 112 into the first input laser beam 202 and the second input laser beam 302. Further, the first laser head 200 defines a first longitudinal axis LA1 along its length. The second laser head 300 defines a second longitudinal axis LA2 along its length. In some embodiments, the first longitudinal axis LA1 and the second longitudinal axis LA2 may be substantially parallel to each other. In the illustrated embodiment, the first and second longitudinal axes LA1, LA2 are along the z-axis. However, in some other embodiments, at least one of the first and second longitudinal axes LA1, LA2 may be inclined to z-axis. Further, in some embodiments, an orientation of at least one of the first and second longitudinal axes LA1, LA2 relative to the z-axis may be adjustable.

In some embodiments, the system 100 may include two laser sources (not shown), where one of the two laser sources emits a laser beam to be received by the first laser head 200, and the other of two laser sources emits a laser beam to be received by the second laser head 300.

The first laser head 200 is configured to emit a first laser beam 204 and be movably disposable on a first side 106 of the first component 102. Similarly, the second laser head 300 is configured to emit a second laser beam 304 and be movably disposable on an opposing second side 108 of the first component 102. The first laser beam 204 is used for welding the first component 102 to the second component 104 at the first side 106 of the first component 102. Similarly, the second laser beam 304 is used for welding the first component 102 to the second component 104 at the second side 108 of the first component 102.

The system 100 further includes a controller 118 configured to independently control a first power P1 of the first laser beam 204 and a second power P2 of the second laser beam 304. The controller 118 may be a programmable analog and/or digital device that can store, retrieve, and process data. In an application, the controller 118 may be a processor, a control circuit, a computer, a workstation, a microprocessor, a microcomputer, a central processing unit, a server, or any suitable device or apparatus.

In some embodiments, the controller 118 is communicably coupled to the splitter 116. In some embodiments, the controller 118 is configured to control the splitter 116 to independently control a first input power P3 of the first input laser beam 202. In some embodiments, the controller 118 is configured to control the splitter 116 to independently control a second input power P4 of the second input laser beam 302. In other words, the controller 118 controls the splitter 116 to independently control the first input power P3 of the first input laser beam 202 and the second input power P4 of the second input laser beam 302 for independently controlling the first power P1 of the first laser beam 204 and the second power P2 of the second laser beam 304. Therefore, as per desirable welding settings, the controller 118 may control the splitter 116 to independently adjust the first power P1 of the first laser beam 204 and the second power P2 of the second laser beam 304.

In some embodiments, the system 100 further includes a first optical fibre 206 optically coupled to the splitter 116. The first optical fibre 206 is configured to receive the first input laser beam 202 from the splitter 116 and supply the first input laser beam 202 to the first laser head 200. In an example, the first optical fibre 206 may be any multi-mode optical fibre, such as, for example, a 600SI (600 µm diameter, step index) optical fibre.

In some embodiments, the system 100 further includes a second optical fibre 306 optically coupled to the splitter 116. The second optical fibre 306 is configured to receive the second input laser beam 302 from the splitter 116 and supply the second input laser beam 302 to the second laser head 300. In an example, the second optical fibre 306 may be any multi-mode optical fibre, such as, for example, a 600SI (600 µm diameter, step index) optical fibre.

With continued reference to FIG. 4, in some embodiments, the system 100 further includes a first connector 208 connecting the first optical fibre 206 to the first laser head 200. Further, in some embodiments, the first laser head 200 includes a first collimating unit 210 configured to receive the first input laser beam 202 from the first optical fibre 206. In other words, the first collimating unit 210 receives the first input laser beam 202 from the first optical fibre 206 through the first connector 208. Therefore, the first connector 208 is configured to supply the first input laser beam 202 to the first collimating unit 210.

In some embodiments, the first collimating unit 210 is configured to collimate the first input laser beam 202 to provide a first collimated laser beam 212. In the illustrated embodiment of FIG. 4, the first collimating unit 210 is a collimating lens. In an example, the first collimating unit 210 may be any suitable collimator, such as, for example, a 100 H COL (100 mm high density collimator). Further, in some embodiments, the first laser head 200 includes a first focusing unit 214 configured to receive the first collimated laser beam 212 from the first collimating unit 210. Specifically, the first collimated laser beam 212 is reflected by a first mirror 216 and then received by the first focusing unit 214. The first focusing unit 214 is configured to focus the first collimated laser beam 212 to provide the first laser beam 204. In the illustrated embodiment of FIG. 4, the first focusing unit 214 is a focus lens. In an example, the first focusing unit 214 may be any suitable focus lens, such as, for example, a 100 H FOC (100 mm high density focus lens).

In some embodiments, the first laser head 200 further includes a first adjustment unit 218 configured to adjust a first axial distance D1 between the first collimating unit 210 and the first focusing unit 214. The first axial distance D1 may be measured along the first longitudinal axis LA1. The controller 118 is communicably coupled to the first adjustment unit 218. The controller 118 is configured to adjust the first axial distance D1 in order to adjust a first laser spot size S1 (shown in FIG. 5A) of the first laser beam 204 incident on the first component 102. In some embodiments, the first adjustment unit 218 may be a fixed or a motorized beam expanding telescope.

Figures 5A, 5B:
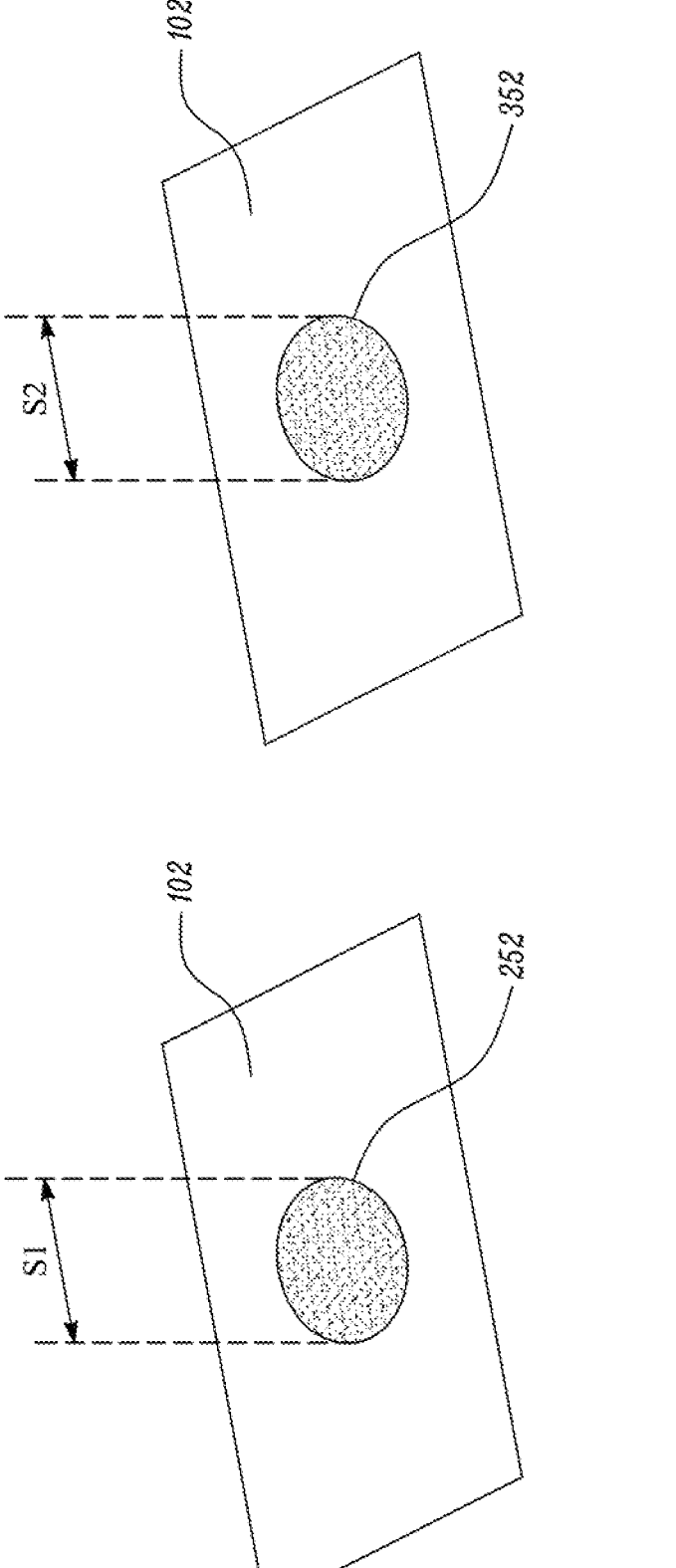
FIG. 5A is a detailed schematic view of the first component.
FIG. 5B is a detailed schematic view of the second component.

FIG. 5A shows a first spot 252 having the first laser spot size 51 formed by the first laser beam 204 incident on the first component 102. The first adjustment unit 218 can adjust the first laser spot size 51 of the first laser beam 204 by adjusting the first axial distance D1 between the first collimating unit 210 and the first focusing unit 214. In other words, the controller 118 adjusts the first axial distance D1 in order to adjust the first laser spot size 51 of the first laser beam 204. Therefore, by adjusting the first laser spot size 51 of the first laser beam 204, the controller 118 can adjust a focus point and a diameter of the first laser beam 204 where it is incident on the first component 102. In other words, the controller 118 may adjust a position of the first laser beam 204 along its length to get the desired first laser spot size 51 formed by the first laser beam 204 incident on the first component 102.

With reference to FIG. 4 again, in some embodiments, the first laser head 200 further includes a first output unit 220 configured to receive the first laser beam 204 from the first focusing unit 214 and emit the first laser beam 204 towards the first component 102. The first laser head 200 further includes a first rotation joint 222 configured to selectively rotate the first output unit 220 about the first longitudinal axis LA1 of the first laser head 200. The controller 118 is communicably coupled to the first rotation joint 222. The controller 118 is configured to control the first rotation joint 222 in order to adjust a first direction F1 (shown in FIG. 6A) of the first laser beam 204 in a first plane 223 orthogonal to the first longitudinal axis LA1.

Figures 6A, 6B:
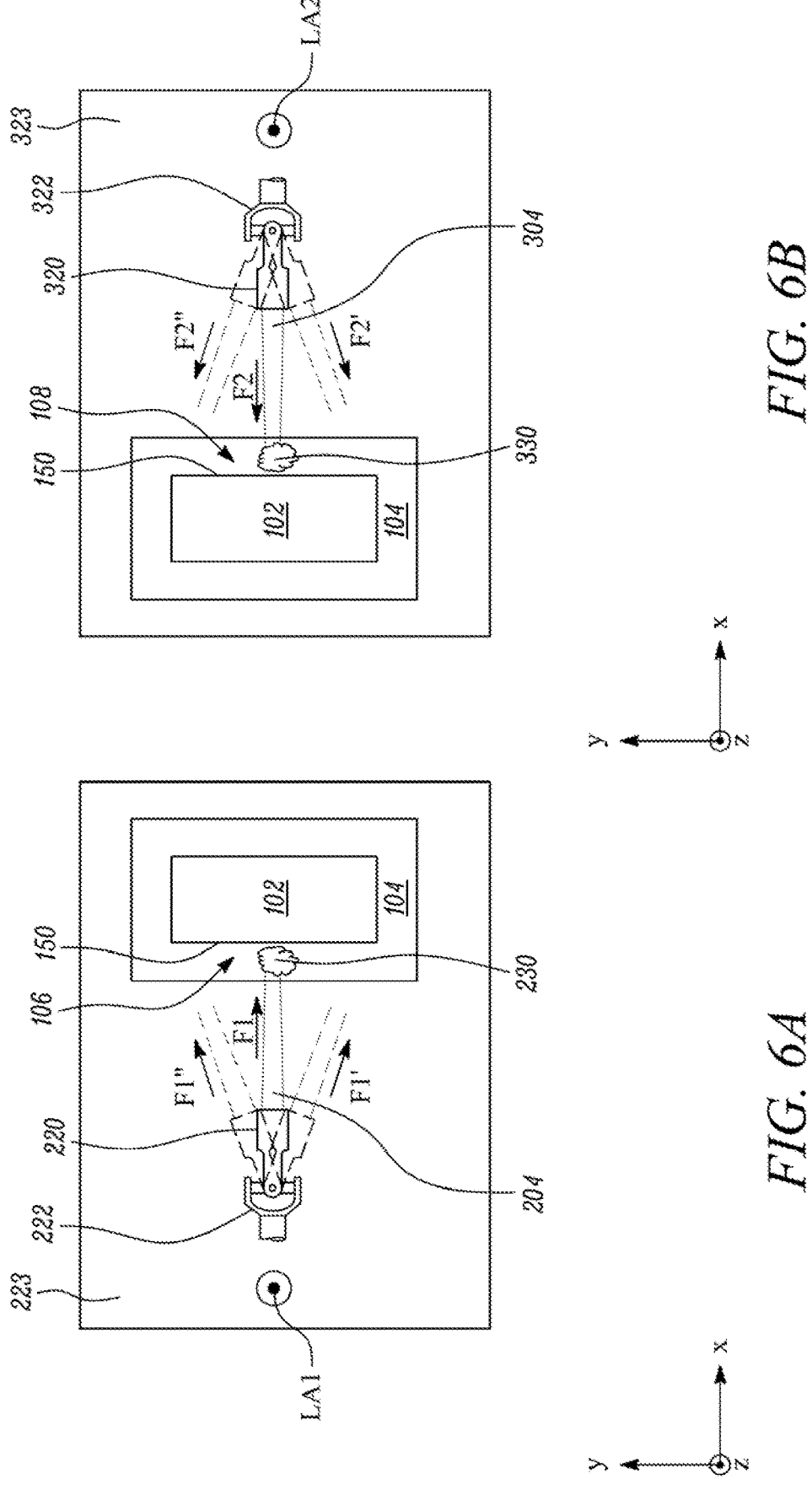
FIG. 6A is a top schematic view of a first output unit and a first rotation joint of the system of FIG. 4.
FIG. 6B is a top schematic view of a second output unit and a second rotation joint of the system of FIG. 4.

FIG. 6A shows a schematic top view of the first output unit 220 and the first rotation joint 222 which selectively rotates the first output unit 220 about the first longitudinal axis LA1. As can be seen in FIG. 6A, the first rotation joint 222 can adjust the first direction F1 of the first laser beam 204 to other first directions F1', F1", and so on, in the first plane 223 orthogonal to the first longitudinal axis LA1. As shown in FIG. 6A, the first plane 223 is in the x-y plane. The controller 118 may therefore control the first rotation joint 222 to adjust the first direction F1 of the first laser beam 204 in the first plane 223. By adjusting the first direction F1 of the first laser beam 204 in the first plane 223, the first output unit 220 may be able to emit the first laser beam 204 at a desired angle on the first side 106 along an interface 150 between the first component 102 and the second component 104. This may enhance a quality of laser weld joint along the interface 150 between the first component 102 and the second component 104 at the first side 106 of the first component 102.

Referring to FIG. 4 again, in some embodiments, the system 100 further includes a first shielding unit 224 configured to emit a first shielding gas 226 around the first laser beam 204. Specifically, the first shielding unit 224 includes a first nozzle 225 to emit the first shielding gas 226 around the first laser beam 204. In an example, the first shielding gas 226 may include at least one of carbon dioxide, nitrogen, helium, and argon. The first shielding gas 226 is used to protect the first and second components 102, 104 from oxidation during laser welding process.

In some embodiments, the system 100 further includes a first imaging unit 228 configured to generate a first image of a first welding zone 230 around the first laser beam 204. The first image of the first welding zone 230 may be schematically shown by a first image 11 in FIG. 4. During welding of the first component 102 to the second component 104 by the first laser beam 204, the first welding zone 230 is created around the first laser beam 204 near the interface 150 at the first side 106 of the first component 102. The controller 118 is communicably coupled to the first imaging unit 228.

The first imaging unit 228 produces a first imaging light 232 that is carried through a first fibre optical cable 234 and further received by a first fibre connector 236. A first collimating lens 238 receives the first imaging light 232 from the first fibre optical cable 234 through the first fibre connector 236. The first collimating lens 238 collimates the first imaging light 232 to provide a first collimated imaging light 240. The first collimated imaging light 240 is directed towards a mirror 242 which is actuated by a motorized system (not shown) such that the first collimated imaging light 240 can be directed to multiple locations within the first welding zone 230 around the first laser beam 204. In the illustrated embodiment of FIG. 4, each of the first collimated imaging light 240 and the first collimated laser beam 212 is focused by the first focusing unit 214. In some other embodiments, the first collimated imaging light 240 may be focused by a separate focusing unit.

Once the first imaging unit 228 generates the first image of the first welding zone 230 around the first laser beam 204, the controller 118 is able to receive the first image of the first welding zone 230. The controller 118 is further configured to control at least one first parameter of the first laser head 200 based on the first image. The controller 118 may use the first image of the first welding zone 230 to determine penetration of weld in the first welding zone 230. In other words, the controller 118 may use the first image to determine a depth of a keyhole in the first welding zone 230. In some cases, in order to determine the penetration of weld in the first welding zone 230, the controller 118 may use the first image and other measurements that may be obtained by mechanical sensors, electronic sensors, capacitive sensors, and so on.

Based on the first image of the first welding zone 230, the controller 118 may determine keyhole depth, location of maximum keyhole depth, keyhole width, keyhole length, keyhole location, average keyhole depth, subsurface keyhole length, subsurface keyhole width, keyhole stability, keyhole collapse, and other physical properties of the first welding zone 230. Based on these properties of the first welding zone 230, the controller 118 controls the at least one first parameter of the first laser head 200. In some embodiments, the at least one first parameter of the first laser head 200 includes settings and characteristics of the first adjustment unit 218, the first rotation joint 222, etc. Thus, the at least one first parameter of the first laser head 200 includes the first direction F1 (shown in FIG. 6A) of the first laser beam 204 in the first plane 223, and the first axial distance D1 between the first collimating unit 210 and the first focusing unit 214. Further, based on the first image of the first welding zone 230, the controller 118 may control the splitter 116 to control the first input power P3 of the first input laser beam 202.

With reference to FIG. 4 again, in some embodiments, the system 100 further includes a second connector 308 connecting the second optical fibre 306 to the second laser head 300. Further, in some embodiments, the second laser head 300 includes a second collimating unit 310 configured to receive the second input laser beam 302 from the second optical fibre 306. In other words, the second collimating unit 310 receives the second input laser beam 302 from the second optical fibre 306 through the second connector 308. Therefore, the second connector 308 is configured to supply the second input laser beam 302 to the second collimating unit 310.

In some embodiments, the second collimating unit 310 is configured to collimate the second input laser beam 302 to provide a second collimated laser beam 312. In the illustrated embodiment of FIG. 4, the second collimating unit 310 is a collimating lens. In an example, the second collimating unit 310 may be any suitable collimator, such as, for example, a 100 H COL (100 mm high density collimator). In some embodiments, the first collimating unit 210 and the second collimating unit 310 are identical to each other. In some other embodiments, the first collimating unit 210 may differ in properties from the second collimating unit 310.

Further, in some embodiments, the second laser head 300 includes a second focusing unit 314 configured to receive the second collimated laser beam 312 from the second collimating unit 310. Specifically, the second collimated laser beam 312 is reflected by a second mirror 316 and then received by the second focusing unit 314. The second focusing unit 314 is configured to focus the second collimated laser beam 312 to provide the second laser beam 304. In the illustrated embodiment of FIG. 4, the second focusing unit 314 is a focus lens. In an example, the second focusing unit 314 may be any suitable focus lens, such as, for example, a 100 H FOC (100 mm high density focus lens). In some embodiments, the first focusing unit 214 and the second focusing unit 314 are identical to each other. In some other embodiments, the first focusing unit 214 may differ in properties from the second focusing unit 314.

In some embodiments, the second laser head 300 further includes a second adjustment unit 318 configured to adjust a second axial distance D2 between the second collimating unit 310 and the second focusing unit 314. The second axial distance D2 may be along the second longitudinal axis LA2. The controller 118 is communicably coupled to the second adjustment unit 318. The controller 118 is configured to adjust the second axial distance D2 in order to adjust a second laser spot size S2 (shown in FIG. 5B) of the second laser beam 304 incident on the first component 102. In some embodiments, the second adjustment unit 318 may be a fixed or a motorized beam expanding telescope.

FIG. 5B shows a second spot 352 having the second laser spot size S2 formed by the second laser beam 304 incident on the first component 102. The second adjustment unit 318 can adjust the second laser spot size S2 of the second laser beam 304 by adjusting the second axial distance D2 between the second collimating unit 310 and the second focusing unit 314. In other words, the controller 118 adjusts the second axial distance D2 in order to adjust the second laser spot size S2 of the second laser beam 304. Therefore, by adjusting the second laser spot size S2 of the second laser beam 304, the controller 118 can adjust a focus point and a diameter of the second laser beam 304 where it is incident on the first component 102. In other words, the controller 118 may adjust a position of the second laser beam 304 along its length to get the desired second laser spot size S2 formed by the second laser beam 304 incident on the first component 102.

With reference to FIG. 4 again, in some embodiments, the second laser head 300 further includes a second output unit 320 configured to receive the second laser beam 304 from the second focusing unit 314 and emit the second laser beam 304 towards the first component 102. The second laser head 300 further includes a second rotation joint 322 configured to selectively rotate the second output unit 320 about the second longitudinal axis LA2 of the second laser head 300. The controller 118 is communicably coupled to the second rotation joint 322. The controller 118 is configured to control the second rotation joint 322 in order to adjust a second direction F2 (shown in FIG. 6B) of the second laser beam 304 in a second plane 323 orthogonal to the second longitudinal axis LA2. In some embodiments, the first rotation joint 222 and the second rotation joint 322 are same as each other. In some other embodiments, the first rotation joint 222 may differ from the second rotation joint 322.

FIG. 6B shows a schematic top view of the second output unit 320 and the second rotation joint 322 which selectively rotates the second output unit 320 about the second longitudinal axis LA2. As can be seen in FIG. 6B, the second rotation joint 322 can adjust the second direction F2 of the second laser beam 304 to other second directions F2', F2'', and so on, in the second plane 323 orthogonal to the second longitudinal axis LA2. As shown in FIG. 6B, the second plane 323 is in the x-y plane. The controller 118 may therefore control the second rotation joint 322 to adjust the second direction F2 of the second laser beam 304 in the second plane 323. By adjusting the second direction F2 of the second laser beam 304 in the second plane 323, the second output unit 320 may be able to emit the second laser beam 304 at a desired angle on the second side 108 along the interface 150 between the first component 102 and the second component 104. This may enhance a quality of laser weld joint along the interface 150 between the first component 102 and the second component 104 at the second side 108 of the first component 102.

Referring to FIG. 4 again, in some embodiments, the system 100 further includes a second shielding unit 324 configured to emit a second shielding gas 326 around the second laser beam 304. Specifically, the second shielding unit 324 includes a second nozzle 325 to emit the second shielding gas 326 around the second laser beam 304. In an example, the second shielding gas 326 may include at least one of carbon dioxide, nitrogen, helium, and argon. The second shielding gas 326 is used to protect the first and second components 102, 104 from oxidation during laser welding process.

In some embodiments, the system 100 further includes a second imaging unit 328 configured to generate a second image of a second welding zone 330 around the second laser beam 304. The second image of the second welding zone 330 may be schematically shown by a second image 12 in FIG. 4. During welding of the first component 102 to the second component 104 by the second laser beam 304, the second welding zone 330 is created around the second laser beam 304 near the interface 150 at the second side 108 of the first component 102. The controller 118 is communicably coupled to the second imaging unit 328. In some embodiments, the first imaging unit 228 and the second imaging unit 328 are same as each other. In some other embodiments, the first imaging unit 228 may differ from the second imaging unit 328.

The second imaging unit 328 produces a second imaging light 332 that is carried through a second fibre optical cable 334 and further received by a second fibre connector 336. A second collimating lens 338 receives the second imaging light 332 from the second fibre optical cable 334 through the second fibre connector 336. The second collimating lens 338 collimates the second imaging light 332 to provide a second collimated imaging light 340. The second collimated imaging light 340 is directed towards a mirror 342 which is actuated by a motorized system (not shown) such that the second collimated imaging light 340 can be directed to multiple locations within the second welding zone 330 around the second laser beam 304. In the illustrated embodiment of FIG. 4, each of the second collimated imaging light 340 and the second collimated laser beam 312 is focused by the second focusing unit 314. In some other embodiments, the second collimated imaging light 340 may be focused by a separate focusing unit.

Once the second imaging unit 328 generates the second image of the second welding zone 330 around the second laser beam 304, the controller 118 is able to receive the second image of the second welding zone 330. The controller 118 is further configured to control at least one second parameter of the second laser head 300 based on the second image. The controller 118 may use the second image of the second welding zone 330 to determine penetration of weld in the second welding zone 330. In other words, the controller 118 may use the second image to determine a depth of a keyhole in the second welding zone 330. In some cases, to determine the penetration of weld in the second welding zone 330, the controller 118 may use the second image and other measurements that may be obtained by mechanical sensors, electronic sensors, capacitive sensors, and so on.

Based on the second image of the second welding zone 330, the controller 118 may determine keyhole depth, location of maximum keyhole depth, keyhole width, keyhole length, keyhole location, average keyhole depth, subsurface keyhole length, subsurface keyhole width, keyhole stability, keyhole collapse, and other physical properties of the second welding zone 330. Based on these properties of the second welding zone 330, the controller 118 controls the at least one second parameter of the second laser head 300. In some embodiments, the at least one second parameter of the second laser head 300 includes settings and characteristics of the second adjustment unit 318, the second rotation joint 322, etc. Thus, the at least one second parameter of the second laser head 300 includes the second direction F2 of the second laser beam 304 in the second plane 323, and the second axial distance D2 between the second collimating unit 310 and the second focusing unit 314. Further, based on the second image of the second welding zone 330, the controller 118 may control the splitter 116 to control the second input power P4 of the second input laser beam 302.

In some embodiments, the system 100 further includes a first arm assembly 244 coupled to the first laser head 200. In an example, the first arm assembly 244 may include a motorised curved or straight arm. In case of a curved interface 150 between the first component 102 and the second component 104 at the first side 106, the first arm assembly 244 with a motorised curved arm is able to move in a corresponding curved profile to match the weld requirements. In an example, the first arm assembly 244 may include a robotic arm. In another example, the first arm assembly 244 may include a pantograph arm. In another example, the first arm assembly 244 may include a snake robot arm with a flexible borescope. The system 100 further includes a first actuator unit 246 configured to move the first arm assembly 244 relative to the first component 102. The first actuator unit 246 may include a motor and gear arrangement to move the first arm assembly 244 relative to the first component 102.

In some embodiments, the system 100 further includes a second arm assembly 344 coupled to the second laser head 300. In an example, the second arm assembly 344 may include a motorised curved or straight arm. In case of a curved interface 150 between the first component 102 and the second component 104 at the second side 108, the second arm assembly 344 with a motorised curved arm is able to move in a corresponding curved profile to match the weld requirements. In an example, the second arm assembly 344 may include a robotic arm. In another example, the second arm assembly 344 may include a pantograph arm. In another example, the second arm assembly 344 may include a snake robot arm with a flexible borescope. The system 100 further includes a second actuator unit 346 configured to move the second arm assembly 344 relative to the first component 102. The second actuator unit 346 may include a motor and gear arrangement to move the second arm assembly 344 relative to the first component 102.

In some embodiments, the controller 118 is communicably coupled to the first actuator unit 246 and the second actuator unit 346. The controller 118 is configured to independently control the first actuator unit 246 and the second actuator unit 346 for independently and simultaneously controlling movement of the first laser head 200 and movement of the second laser head 300 relative to the first component 102. In other words, the controller 118 is configured to independently and simultaneously control the movement of the first laser head 200 and the movement of the second laser head 300 relative to the first component 102 in order to weld the first component 102 to the second component 104 along the interface 150 between the first component 102 and the second component 104. In an example, the controller 118 may independently control the first actuator unit 246 and the second actuator unit 346 to produce a greater or lesser movement in the first laser head 200 as compared to the movement in the second laser head 300. In an example, the controller 118 may independently control the first actuator unit 246 and the second actuator unit 346 to produce relatively frequent movements in the first laser head 200 as compared to the movements in the second laser head 300.

Referring to FIGS. 4 to 6B, in some cases, the controller 118 may control the first actuator unit 246 to move the first laser head 200 based on a profile of the interface 150 between the first component 102 and the second component 104 at the first side 106. In some cases, the controller 118 may control the second actuator unit 346 to move the second laser head 300 based on a profile of the interface 150 between the first component 102 and the second component 104 at the second side 106. In some cases, the controller 118 may control the first actuator unit 246 to move the first laser head 200 based on the first power P1 of the first laser beam 204. In some cases, the controller 118 may control the second actuator unit 346 to move the second laser head 300 based on the second power P2 of the second laser beam 304. In some cases, the controller 118 may control the first actuator unit 246 to move the first laser head 200 based on the first laser spot size S1 of the first laser beam 204 incident on the first component 102. In some cases, the controller 118 may control the second actuator unit 346 to move the second laser head 300 based on the second laser spot size S2 of the second laser beam 304 incident on the second component 104.

Figure 7:
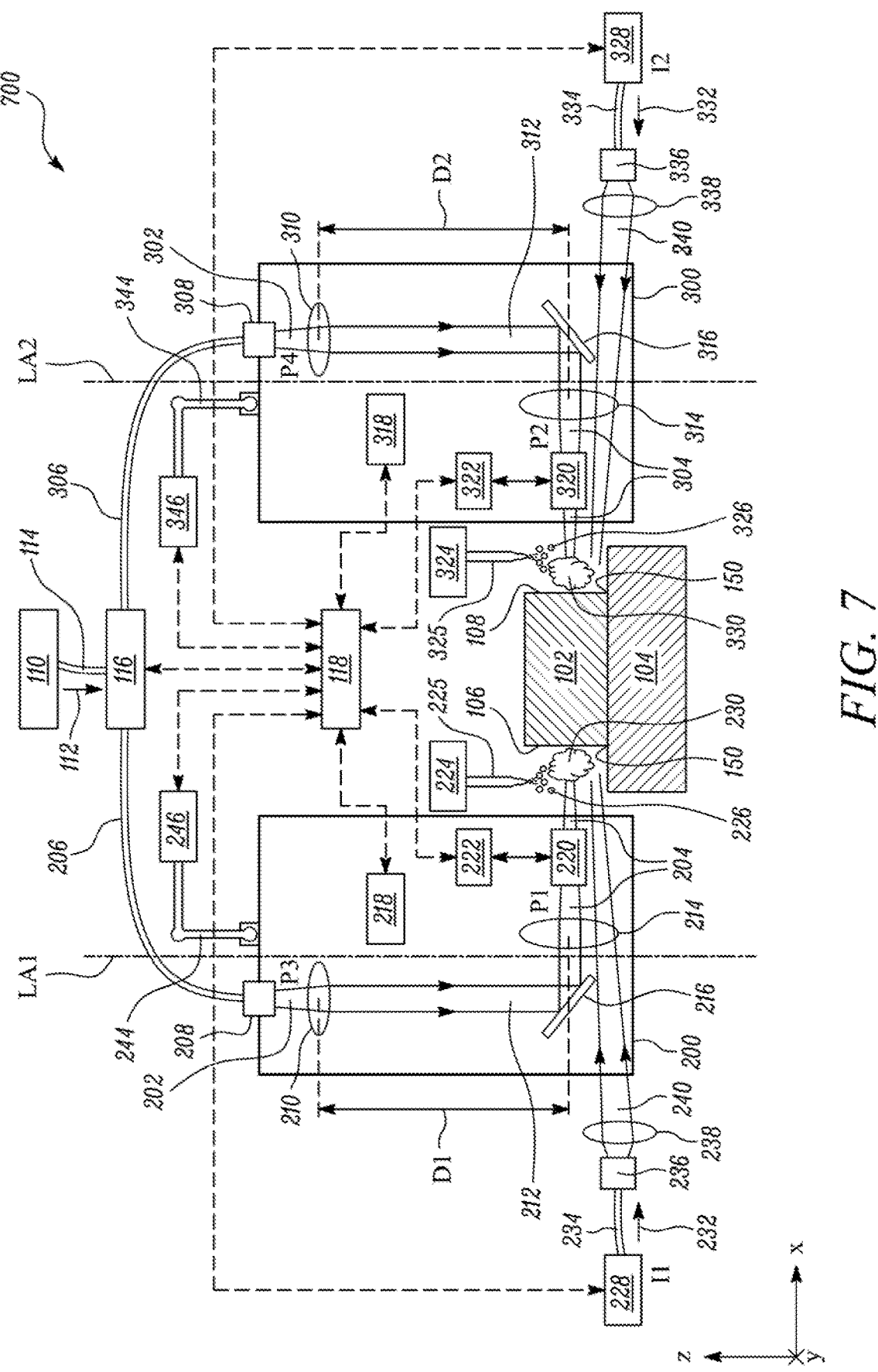
FIG. 7 is a schematic block diagram of a system for welding a first component to a second component, according to another embodiment of the present disclosure.

FIG. 7 shows a system 700 for welding the first component 102 to the second component 104, according to an embodiment of the present disclosure. The system 700 is substantially similar to the system 100 of FIG. 4, with like elements designated by like reference characters. However, in the system 700, the first imaging unit 228 is substantially co-axial with the weld process at the first side 106 of the first component 102, in which the first collimating lens 238 is in line with the weld location at the first side 106 of the first component 102. Further, in the system 700, the second imaging unit 328 is substantially co-axial with the weld process at the second side 108 of the second component 104, in which the second collimating lens 338 is in line with the weld location at the second side 108 of the first component 102. Therefore, there are no mirrors in the system 700 for receiving the first and second collimated imaging lights 240, 340.

It should be noted that the first and second components 102, 104 are schematically shown in FIGS. 4 to 7 for illustrative purposes only, and the first and second components 102, 104 may have any suitable shape and dimensions based on the application.

Referring to FIGS. 4 and 7, emission of the first laser beam 204 on the first side 106 of the first component 102 and emission of the second laser beam 304 on the second side 108 of the first component 102 may produce a relatively accurate weld joint between the first component 102 and the second component 104.

In an example with the OGV 42 (shown in FIG. 1) as the first component 102 and the core casing 44 (shown in FIG. 1) as the second component 104, the system 100 with the first and second laser heads 200, 300 may produce a relatively accurate weld joint between the one or more OGVs 42 and the core casing 44. Further, the system 100 with the inclusion of the first and second laser heads 200, 300 with their respective first and second laser beams 204, 304 may easily weld the OGVs 42 to the core casing 44 as compared to conventional welding systems facing the challenges of complicated shapes and size of aerofoil structure of the OGVs 42. Thus, a quality of weld joint provided by the system 100 with two laser heads (i.e., the first laser head 200 and the second laser head 300) may be minimally affected by the limited access and the curvature of the aerofoil structure of the OGV 42. The system 100 may therefore generate a desirable welding at different portions of a welding zone between the first component 102 and the second component 104.

In the system 100, for welding the first component 102 to the second component 104, the first laser beam 204 is emitted at the first side 106 of the first component 102 and the second laser beam 304 is emitted at the second side 108 of the first component 102. Welding the first component 102 to the second component 104 by using two laser beams (i.e., the first and second laser beams 204, 304) may eliminate any distortion of the first component 102 towards one of the first and second sides 106, 108 as compared to conventional welding techniques. In an example, welding the OGV 42 (i.e., the first component 102) to the core casing 44 (i.e., the second component 104) by using the first and second laser beams 204, 304 may not cause distortion of the OGV 42 towards one of its opposing first and second sides. Further, with the inclusion of two laser heads (i.e., the first and second laser heads 200, 300), it may be relatively easier for the system 100 to access the second side 108 to weld the first component 102 to the second component 104 at the second side 108. This may further help to maintain a desirable thickness of a material being welded at both the first and opposing second sides 106, 108 of the first component 102.

Moreover, for welding the first component 102 to the second component 102 by using the first laser beam 204 and the second laser beam 304, there is no requirement for a vacuum chamber, which was otherwise required in the conventional systems for welding the first component 102 to the second component 104 by an electron beam. This may further reduce an overall cost of welding the first component

102 to the second component 104 by the first laser head 200 and the second laser head 300.

As mentioned above, for welding the first component 102 to the second component 104, the controller 118 of the system 100 independently controls the first power P1 of the first laser beam 204 and the second power P2 of the second laser beam 304. In an example, due to constantly changing cross sections and thickness of the OGV 42 (i.e., the first component 102), the system 100 including the controller 118 may emit the first laser beam 204 with a desirable first power P1 and the second laser beam 304 with a desirable second power P2. Therefore, the system 100 including the controller 118 may emit differently powered laser beams at different sections of the interface 150 between the first component 102 and the second component 104. By controlling and adjusting the first and second powers P1, P2 of the respective first and second laser beams 204, 304, the system 100 may produce a relatively accurate joint alignment as compared to the conventional welding systems. Some applications may require different values of the first and second powers P1, P2 of the respective first and second laser beams 204, 304 to generate a precise weld joint between the first component 102 and the second component 104.

As mentioned above, the system 100 including the controller 118 may independently and simultaneously control the movement of the first laser head 200 and the movement of the second laser head 300 relative to the first component 102. The independent and simultaneous movement of the first laser head 200 and the second laser head 300 relative to the first component 102 may therefore help the system 100 to emit the first and second laser beams 204, 304 across the overall area of the interface 150 between the first component 102 and the second component 104. This may also help in welding the first component 102 to the second component 104 at the areas which are not directly located in the line of sight.

Figure 8A:
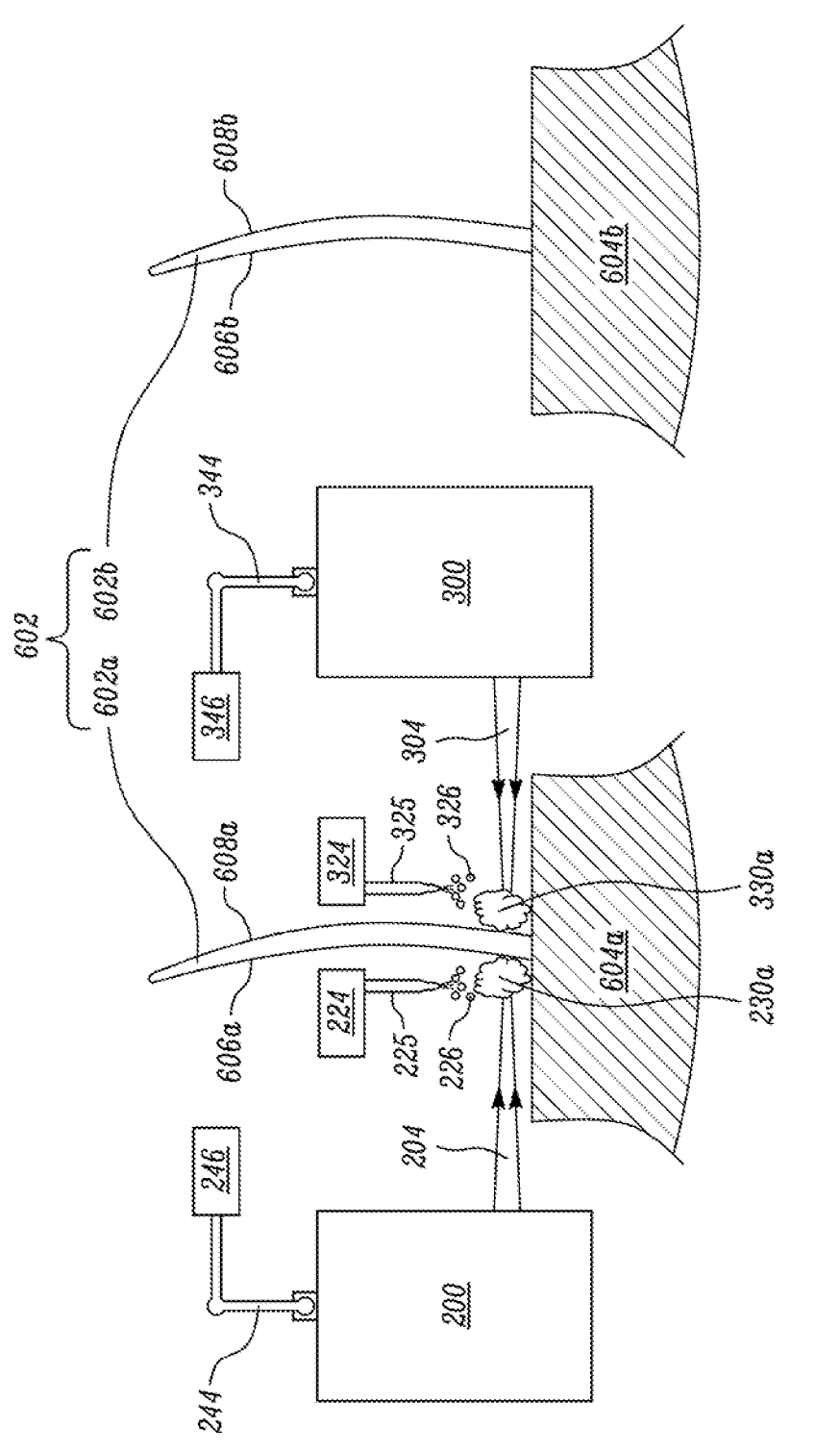
FIG. 8A is a schematic block diagram of first and second laser heads of the system of FIG. 4 for welding the first component to the second component, according to an embodiment of the present disclosure.
Figure 8B:
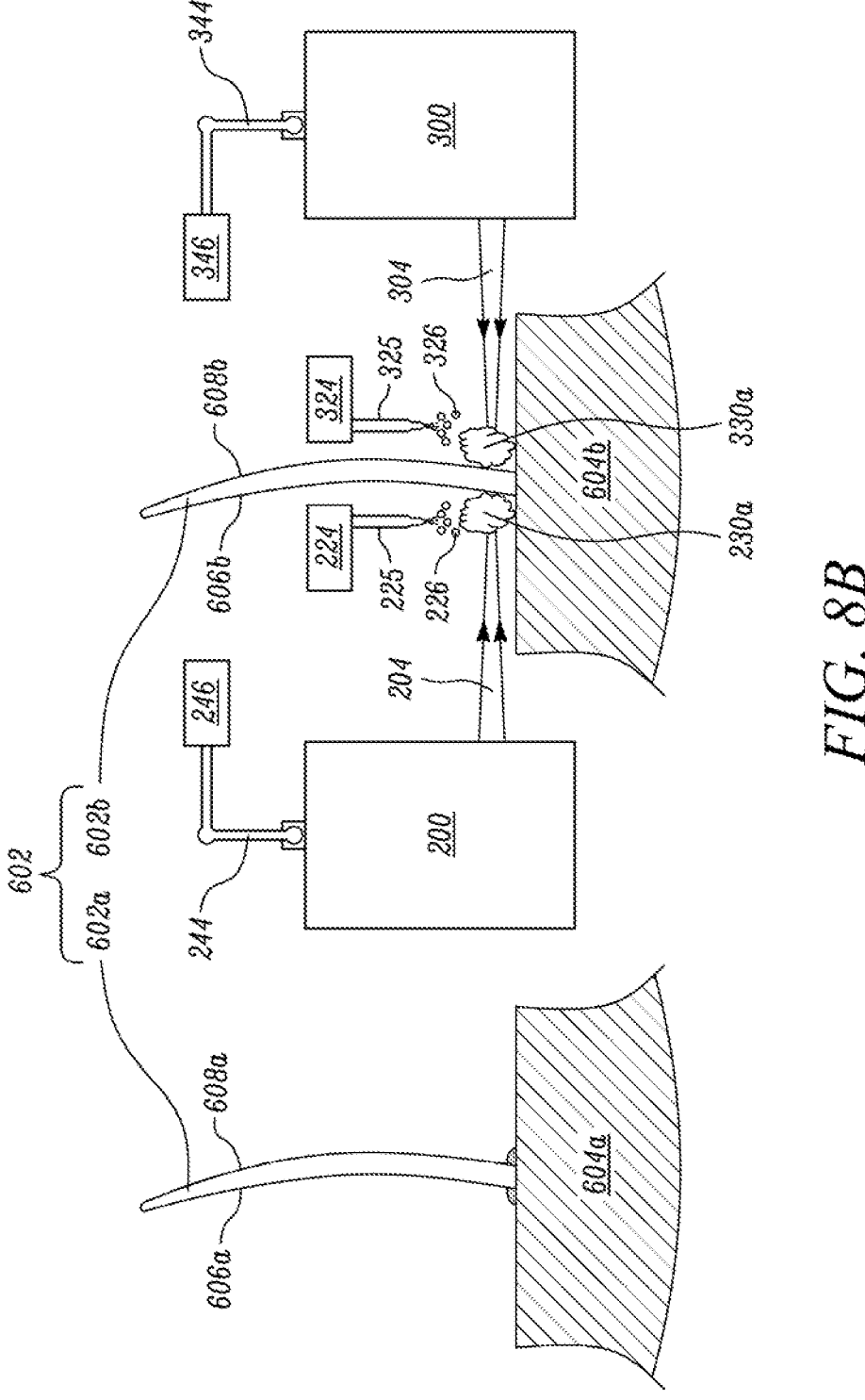
FIG. 8B is another schematic block diagram of the first and second laser heads for welding another first component to a corresponding second component, according to an embodiment of the present disclosure.

FIGS. 8A and 8B illustrates the first and second laser heads 200, 300 of the system 100 used for welding a plurality of first components 602 to corresponding second components 604 of the gas turbine engine 10 of FIG. 1. Each first component 602 may be one of the OGVs 42 of the gas turbine 10. The corresponding second component 604 may be a stub disposed on the core casing 44 of the gas turbine engine 10. The first components 602 and second components 604 are generally circumferentially spaced apart from each other. The system 100 may be used to sequentially weld each first component 602 to the corresponding second component 604. In the illustrated embodiment of FIGS. 8A and 8B, two first components 602a, 602b and corresponding two second components 604a, 604b are illustrated for the purposes of explanation.

FIG. 8A illustrates welding of the first component 602a (i.e., an OGV 42) to the second component 604a (i.e., the stub of the core casing 44) by using the first and second laser heads 200, 300 of the system 100. As shown in FIG. 8A, the first laser head 200 emits the first laser beam 204 to weld the first component 602a to the second component 604a on a first side 606a of the first component 602a. Thus, the first laser head 200 of the system 100 is controlled to laser weld the OGV 42 (i.e., the first component 602a) to the stub (i.e., the second component 604a) of the core casing 44 on the first side 606a of the OGV 42. As shown in FIG. 8A, the second laser head 300 emits the second laser beam 304 to weld the first component 602a to the second component 604a on an opposing second side 608a of the first component 602a. Thus, the second laser head 300 of the system 100 is controlled to laser weld the OGV 42 (i.e., the first component 602a) to the stub (i.e., the second component 604a) of the core casing 44 on the second side 608a of the OGV 42. During welding of the first component 602a to the second component 604a, first and second welding zones 230a, 330a are generated at the respective first and second sides 606a, 608a of the first component 602a.

After welding the first component 602a to the second component 604a, the first and second laser heads 200, 300 are moved to opposing first and second sides 606b, 608b of another first component 602b (i.e., another OGV 42). Specifically, the first laser head 200 is moved and controlled by the first actuator assembly 246 and the first arm assembly 244. The second laser head 300 is moved and controlled by the second actuator assembly 346 and the second arm assembly 344.

FIG. 8B illustrates welding of the first component 602b (i.e., the other OGV 42) to the second component 604b (i.e., the corresponding stub of the core casing 44) by using the first and second laser heads 200, 300 of the system 100. As shown in FIG. 8B, the first laser head 200 emits the first laser beam 204 to weld the first component 602b to the second component 604b on the first side 606b of the first component 602b. Thus, the first laser head 200 of the system 100 is controlled to laser weld the other OGV 42 (i.e., the first component 602b) to the corresponding stub (i.e., the second component 604b) of the core casing 44 on the first side 606b of the other OGV 42. As shown in FIG. 8B, the second laser head 300 emits the second laser beam 304 to weld the first component 602b to the second component 604b on the opposing second side 608b of the first component 602b. Thus, the second laser head 300 of the system 100 is controlled to laser weld the other OGV 42 (i.e., the first component 602b) to the corresponding stub (i.e., the second component 604b) of the core casing 44 on the second side 608b of the other OGV 42. During welding of the first component 602b to the second component 604b, first and second welding zones 230b, 330b are generated at the respective first and second sides 606b, 608b of the first component 602b.

Therefore, with reference to FIGS. 8A and 8B, the system 100 including the first and second laser heads 200, 300 may be used to weld the plurality of first components 602 to the corresponding second components 604 of the gas turbine engine 10 of FIG. 1.

Figure 9:
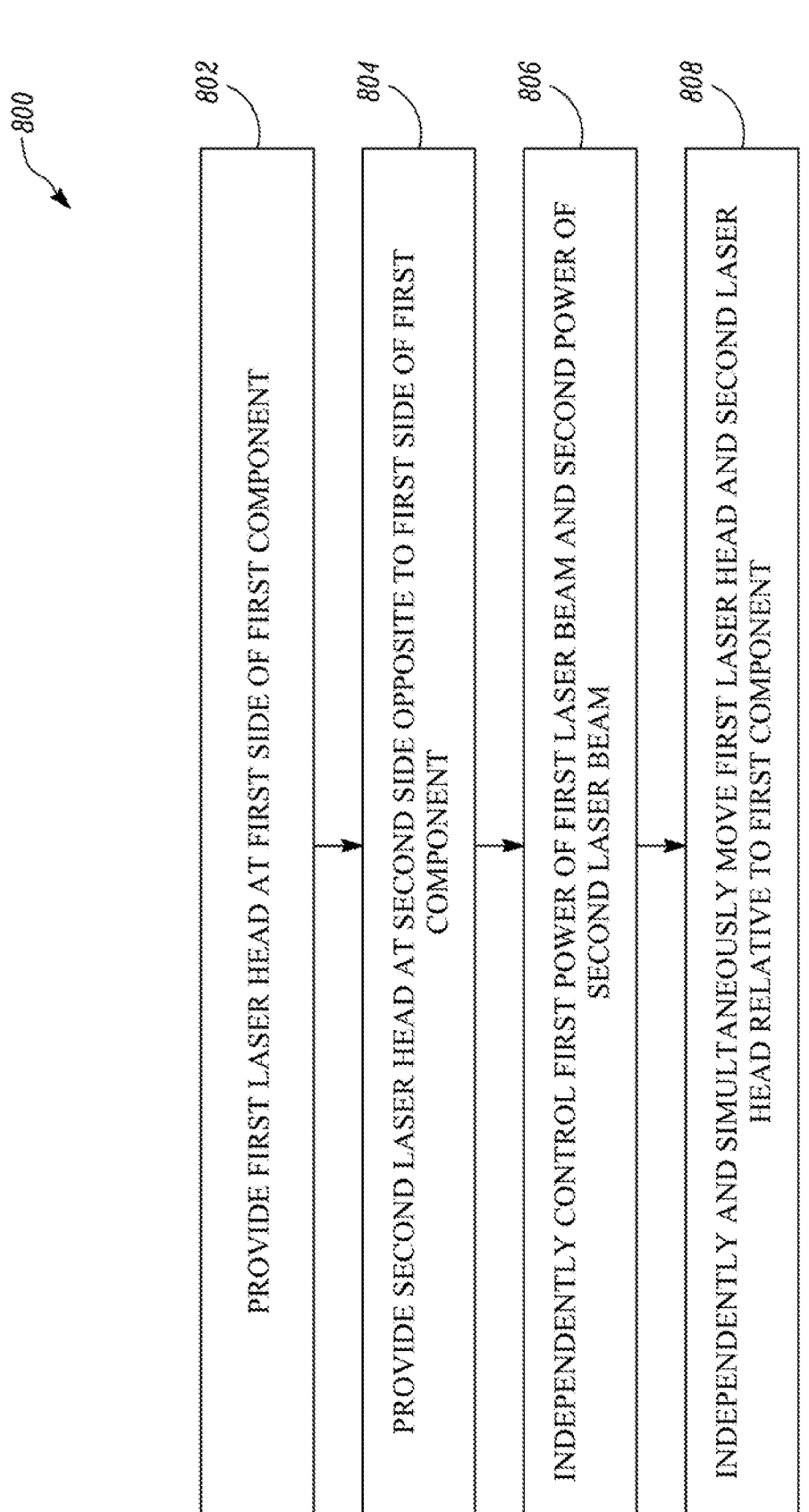
FIG. 9 is a flowchart depicting a method for welding the first component to the second component, according to an embodiment of the present disclosure.

FIG. 9 illustrates a flowchart depicting a method 800 for welding the first component 102 (shown in FIG. 4) to the second component 104 (shown in FIG. 4), according to an embodiment of the present disclosure. In some embodiments, the first component 102 and the second component 104 are components of the gas turbine engine 10 (shown in FIG. 1). In some embodiments, the first component 102 is an OGV 42 (shown in FIG. 1) and the second component is a part of the core casing 44 (shown in FIG. 1).

Referring to FIGS. 4 and 9, at step 802, the method 800 includes providing the first laser head 200 at the first side 106 of the first component 102. The first laser head 200 is configured to emit the first laser beam 204. At step 804, the method 800 further includes providing the second laser head 300 at the second side 108 opposite to the first side 106 of the first component 102. The second laser head 300 is configured to emit the second laser beam 304.

At step 806, the method 800 further includes independently controlling the first power P1 of the first laser beam 204 and the second power P2 of the second laser beam 304. Specifically, the controller 118 controls the splitter 116 to independently control the first input power P3 of the first input laser beam 202 and the second input power P4 of the second input laser beam 302 for independently controlling the first power P1 of the first laser beam 204 and the second power P2 of the second laser beam 304.

At step 808, the method 800 further includes independently and simultaneously moving the first laser head 200 and the second laser head 300 relative to the first component 102 in order to weld the first component 102 to the second component 104 along the interface 150 between the first component 102 and the second component 104.

Referring to FIGS. 4, 5A, and 9, in some embodiments, the method 800 further includes adjusting the first laser spot size 51 of the first laser beam 204 incident on the first component 102. The controller 118 is communicably coupled to the first adjustment unit 218 to adjust the first axial distance D1 in order to adjust the first laser spot size S1 of the first laser beam 204 incident on the first component 102. Moreover, the controller 118 may control the first actuator unit 246 to move the first laser head 200 based on a desired value of the first laser spot size 51 of the first laser beam 204 incident on the first component 102.

Referring to FIGS. 4, 5B, and 9, in some embodiments, the method 800 further includes adjusting the second laser spot size S2 of the second laser beam 304 incident on the first component 102. The controller 118 is communicably coupled to the second adjustment unit 318 to adjust the second axial distance D2 in order to adjust the second laser spot size S2 of the second laser beam 304 incident on the first component 102. Moreover, the controller 118 may control the second actuator unit 346 to move the second laser head 300 based on a desired value of the second laser spot size S2 of the second laser beam 304 incident on the first component 102.

Referring to FIGS. 4, 6A, and 9, in some embodiments, the method 800 further includes adjusting the first direction F1 of the first laser beam 204 in the first plane 223 orthogonal to the first longitudinal axis LA1 of the first laser head 200. The controller 118 is communicably coupled to the first rotation joint 222 to control the first rotation joint 222 in order to adjust the first direction F1 of the first laser beam 204 in the first plane 223. By adjusting the first direction F1 of the first laser beam 204 in the first plane 223, the first output unit 220 may be able to emit the first laser beam 204 at a desired angle on the first side 106 along the interface 150 between the first component 102 and the second component 104.

Referring to FIGS. 4, 6B, and 9, in some embodiments, the method 800 further includes adjusting the second direction F2 of the second laser beam 304 in the second plane 323 orthogonal to the second longitudinal axis LA2 of the second laser head 300. The controller 118 is communicably coupled to the second rotation joint 322 to control the second rotation joint 322 in order to adjust the second direction F2 of the second laser beam 304 in the second plane 323. By adjusting the second direction F2 of the second laser beam 304 in the second plane 323, the second output unit 320 may be able to emit the second laser beam 304 at a desired angle on the second side 108 along the interface 150 between the first component 102 and the second component 104.

Referring to FIGS. 4 and 9, in some embodiments, the method 800 further includes emitting the first shielding gas 226 around the first laser beam 204. The first shielding unit 224 emits the first shielding gas 226 to protect the first and second components 102, 104 from oxidation during laser welding process. The method 800 further includes emitting the second shielding gas 326 around the second laser beam 304. The second shielding unit 324 emits the second shielding gas 326 to protect the first and second components 102, 104 from oxidation during laser welding process.

Referring to FIGS. 4 and 9, in some embodiments, the method 800 further includes obtaining the first image of the first welding zone 230 around the first laser beam 204. The first image of the first welding zone 230 is generated by the first imaging unit 228 communicably coupled to the controller 118. The method 800 further includes controlling the at least one first parameter of the first laser head 200 based on the first image of the first welding zone 230. The at least one first parameter of the first laser head 200 may include settings and characteristics of the first adjustment unit 218, the first rotation joint 222, etc. The at least one first parameter of the first laser head 200 may include the first direction F1 of the first laser beam 204 in the first plane 223, and the first axial distance D1 between the first collimating unit 210 and the first focusing unit 214.

In some embodiments, the method 800 further includes obtaining the second image of the second welding zone 330 around the second laser beam 304. The second image of the second welding zone 330 is generated by the second imaging unit 328 communicably coupled to the controller 118. The method 800 further includes controlling the at least one second parameter of the second laser head 300 based on the second image of the second welding zone 330. The at least one second parameter of the second laser head 300 may include settings and characteristics of the second adjustment unit 318, the second rotation joint 322, etc. The at least one second parameter of the second laser head 300 may include the second direction F2 of the second laser beam 304 in the first plane 323, and the second axial distance D2 between the second collimating unit 310 and the second focusing unit 314.

Referring to FIGS. 1, 8A, 8B, and 9, the method 800 further includes moving the first laser head 200 and the second laser head 300 on opposing sides (i.e., the first and second sides 606b, 608b) of another first component 602b after welding the first component 602a to the second component 604a. The method 800 further includes controlling the first laser head 200 and the second laser head 300 to weld the other first component 602b to the corresponding second component 604b.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A system for welding a first component to a second component, the system comprising:
a first laser head configured to emit a first laser beam and be movably disposable on a first side of the first component;
a second laser head configured to emit a second laser beam and be movably disposable on an opposing second side of the first component;
a first actuator unit configured to move the first laser head relative to the first component;
a second actuator unit configured to move the second laser head relative to the first component; and
a controller communicably coupled to the first actuator unit and the second actuator unit and configured to:
independently control a first power of the first laser beam and a second power of the second laser beam;

independently control the first actuator unit and the second actuator unit to independently and simultaneously control movement of the first laser head and movement of the second laser head relative to the first component in order to weld the first component to the second component along an interface between the first component and the second component; and
independently control one of the first actuator unit and the second actuator unit to produce a greater or lesser movement of the first laser head or the second laser head as compared to the movement of the other.

2. The system of claim 1, further comprising:
a laser source configured to emit a laser radiation; and
a splitter optically coupled to the laser source and configured to split the laser radiation into a first input laser beam to be supplied to the first laser head and a second input laser beam to be supplied to the second laser head;
wherein the controller is communicably coupled to the splitter and further configured to control the splitter to independently control a first input power of the first input laser beam and a second input power of the second input laser beam for independently controlling the first power of the first laser beam and the second power of the second laser beam.

3. The system of claim 2, further comprising:
a first optical fibre optically coupled to the splitter and configured to receive the first input laser beam from the splitter and supply the first input laser beam to the first laser head; and
a second optical fibre optically coupled to the splitter and configured to receive the second input laser beam from the splitter and supply the second input laser beam to the second laser head.

4. The system of claim 3, wherein the first laser head comprises:
a first collimating unit configured to receive the first input laser beam from the first optical fibre and collimate the first input laser beam to provide a first collimated laser beam; and
a first focusing unit configured to receive the first collimated laser beam from the first collimating unit and focus the first collimated laser beam to provide the first laser beam.

5. The system of claim 4, wherein:
the first laser head further comprises a first adjustment unit configured to adjust a first axial distance between the first collimating unit and the first focusing unit; and
the controller is communicably coupled to the first adjustment unit and configured to adjust the first axial distance in order to adjust a first laser spot size of the first laser beam incident on the first component.

6. The system of claim 4, wherein the first laser head further comprises:
a first output tip configured to receive the first laser beam from the first focusing unit and emit the first laser beam towards the first component; and
a first rotation joint configured to selectively rotate the first output tip about a first longitudinal axis of the first laser head;
wherein the controller is communicably coupled to the first rotation joint and further configured to control the first rotation joint in order to adjust a first direction of the first laser beam in a first plane orthogonal to the first longitudinal axis.

7. The system of claim 3, further comprising a first connector connecting the first optical fibre to the first laser head and configured to supply the first input laser beam to the first collimating unit.

8. The system of claim 3, wherein the second laser head comprises:

a second collimating unit configured to receive the second input laser beam from the second optical fibre and collimate the second input laser beam to provide a second collimated laser beam; and a second focusing unit configured to receive the second collimated laser beam from the second collimating unit and focus the second collimated laser beam to provide the second laser beam.

9. The system of claim 8, further comprising a second connector connecting the second optical fibre to the second laser head and configured to supply the second input laser beam to the second collimating unit.

10. The system of claim 8, wherein the second laser head further comprises a second adjustment unit configured to adjust a second axial distance between the second collimating unit and the second focusing unit; and the controller is communicably coupled to the second adjustment unit and configured to adjust the second axial distance in order to adjust a second laser spot size of the second laser beam incident on the first component.

11. The system of claim 8, wherein the second laser head further comprises: a second output tip configured to receive the second laser beam from the second focusing unit and emit the second laser beam towards the first component; and a second rotation joint configured to selectively rotate the second output tip about a second longitudinal axis of the second laser head; wherein the controller is communicably coupled to the second rotation joint and further configured to control the second rotation joint in order to adjust a second direction of the second laser beam in a second plane orthogonal to the second longitudinal axis.

12. A system for welding a first component to a second component, the system comprising:

a first laser head configured to emit a first laser beam and be movably disposable on a first side of the first component;

a second laser head independent of the first laser head and configured to emit a second laser beam and be movably disposable on an opposing second side of the first component;

a first arm assembly coupled to the first laser head;

a first actuator unit configured to move the first arm assembly relative to the first component;

a second arm assembly coupled to the second laser head; and a second actuator unit configured to move the second arm assembly relative to the first component; and a controller communicably coupled to the first actuator unit and the second actuator unit and configured to:

independently control a first power of the first laser beam and a second power of the second laser beam;

independently control the first actuator unit and the second actuator unit for independently and simultaneously controlling the movement of the first laser head and the movement of the second laser head relative to the first component in order to weld the first component to the second component along an interface between the first component and the second component;

independently control one of the first actuator unit and the second actuator unit to produce a greater or lesser movement of the first laser head or the second laser head as compared to the movement of the other;

independently control the first actuator unit to move the first laser head based on a profile of the interface between the first component and the second component at the first side; and independently control the second actuator unit to move the second laser head based on a profile of the interface between the first component and the second component at the second side.

13. The system of claim 1, further comprising:

a first imaging unit configured to generate a first image of a first welding zone around the first laser beam;

a second imaging unit configured to generate a second image of a second welding zone around the second laser beam;

a first shielding unit configured to emit a first shielding gas around the first laser beam; and a second shielding unit configured to emit a second shielding gas around the second laser beam;

wherein the controller is communicably coupled to the first imaging unit and the second imaging unit, and the controller is further configured to control at least one first parameter of the first laser head based on the first image and control at least one second parameter of the second laser head based on the second image.

14. The system of claim 1, wherein the first component and the second component are components of a gas turbine engine.

15. A method for welding a first component to a second component, the method comprising the steps of:

providing a first laser head at a first side of the first component, wherein the first laser head is configured to emit a first laser beam;

providing a second laser head at a second side opposite to the first side of the first component, wherein the second laser head is configured to emit a second laser beam;

independently controlling a first power of the first laser beam and a second power of the second laser beam;

independently and simultaneously moving the first laser head and the second laser head relative to the first component in order to weld the first component to the second component along an interface between the first component and the second component; and independently moving one of the first laser head and the second laser head more or less compared to the other of the first laser head and the second laser head.

16. The method of claim 15, further comprising:

adjusting a first laser spot size of the first laser beam incident on the first component; and adjusting a second laser spot size of the second laser beam incident on the first component.

17. The method of claim 15, further comprising:

adjusting a first direction of the first laser beam in a first plane orthogonal to a first longitudinal axis of the first laser head; and adjusting a second direction of the second laser beam in a second plane orthogonal to a second longitudinal axis of the second laser head.

18. The method of claim 15, further comprising:

obtaining a first image of a first welding zone around the first laser beam;

controlling at least one first parameter of the first laser head based on the first image;

obtaining a second image of a second welding zone around the second laser beam; and controlling at least one second parameter of the second laser head based on the second image.

19. The method of claim 15, further comprising:

moving the first laser head and the second laser head on opposing sides of another first component after welding the first component to the second component; and controlling the first laser head and the second laser head to weld the other first component to a corresponding second component.

20. The method of claim 15, wherein the first component and the second component are components of a gas turbine engine.

* * * * *